(12) United States Patent
Yoon et al.

(10) Patent No.: US 12,549,501 B2
(45) Date of Patent: Feb. 10, 2026

(54) METHOD, COMPUTER DEVICE, AND NON-TRANSITORY COMPUTER-READABLE RECORD MEDIUM TO DISPLAY ACTIVITY TIME INFORMATION FOR CHATROOM

(71) Applicant: LINE Plus Corporation, Seongnam-si (KR)

(72) Inventors: Dae Eun Yoon, Seongnam-si (KR); EuGene Ko, Seongnam-si (KR); Soon Hyun Kwon, Seongnam-si (KR); Daeun Jung, Seongnam-si (KR); SeonYoung Kang, Seongnam-si (KR); Chaewon Jung, Seongnam-si (KR); Seo Hyun Cho, Seongnam-si (KR)

(73) Assignee: LINE PLUS CORPORATION, Gyeonggi-Do (KR)

( * ) Notice: Subject to any disclaimer, the term of this patent is extended or adjusted under 35 U.S.C. 154(b) by 0 days.

(21) Appl. No.: 18/670,212

(22) Filed: May 21, 2024

(65) Prior Publication Data

US 2024/0396854 A1    Nov. 28, 2024

(30) Foreign Application Priority Data

May 24, 2023   (KR) .......................... 10-2023-0066908

(51) Int. Cl.
| | | |
|---|---|---|
| *G06F 15/16* | (2006.01) | |
| *H04L 51/04* | (2022.01) | |
| *H04L 51/212* | (2022.01) | |
| *H04L 51/216* | (2022.01) | |

(52) U.S. Cl.
CPC ............ *H04L 51/04* (2013.01); *H04L 51/212* (2022.05); *H04L 51/216* (2022.05)

(58) Field of Classification Search
CPC ...... H04L 51/04; H04L 51/216; H04L 51/212
USPC ......................................................... 709/206
See application file for complete search history.

(56) References Cited

U.S. PATENT DOCUMENTS

| | | | | |
|---|---|---|---|---|
| 7,996,470 | B2 * | 8/2011 | Daniell | .................... H04L 51/04 709/206 |
| 8,150,716 | B1 * | 4/2012 | Lunsford | ........... G06Q 30/0203 705/7.11 |
| 8,176,130 | B2 * | 5/2012 | Daniell | ................. H04L 51/212 709/206 |
| 8,359,319 | B2 * | 1/2013 | Pendse | .................... G06Q 30/02 707/754 |
| 8,447,823 | B2 * | 5/2013 | Zhang | ..................... H04L 51/04 709/219 |
| 8,468,010 | B2 * | 6/2013 | Chaturvedi | ............. G06F 40/40 704/277 |

(Continued)

FOREIGN PATENT DOCUMENTS

KR   10-2002-0074304 A   9/2002

*Primary Examiner* — Alicia Baturay
(74) *Attorney, Agent, or Firm* — Harness, Dickey & Pierce, P.L.C.

(57) ABSTRACT

Disclosed are a method, a computer device, and a non-transitory computer-readable record medium to display activity time information of a chatroom. An activity time information display method may include receiving a user request for activity time information of a chatroom related to an instant messenger from a user of the computer device for the chatroom related to the instant messenger and displaying the activity time information of the chatroom on a chatroom-related screen of the chatroom in response to the user request.

18 Claims, 10 Drawing Sheets

(56) References Cited

U.S. PATENT DOCUMENTS

| | | | | |
|---|---|---|---|---|
| 8,522,168 | B2* | 8/2013 | Williams | H04L 12/1831 715/713 |
| 8,558,868 | B2* | 10/2013 | Prentice | H04N 7/147 348/14.09 |
| 8,892,670 | B2* | 11/2014 | Chakravarthy | H04N 21/4886 705/14.66 |
| 9,043,422 | B2* | 5/2015 | Zhang | H04L 67/10 709/219 |
| 9,077,750 | B2* | 7/2015 | Little | H04L 67/02 |
| 9,262,531 | B2* | 2/2016 | Ferren | G06F 16/9535 |
| 9,483,529 | B1* | 11/2016 | Pasoi | H04L 51/52 |
| 9,900,278 | B2* | 2/2018 | Bank | H04L 51/226 |
| 9,992,150 | B2* | 6/2018 | Koolwal | H04L 51/52 |
| 10,685,074 | B2* | 6/2020 | Deets, Jr. | G06F 40/35 |
| 10,972,524 | B1* | 4/2021 | Chambers | H04L 65/765 |
| 11,030,421 | B2* | 6/2021 | Tanaka | G06F 40/47 |
| 11,188,623 | B2* | 11/2021 | Joung | H04L 51/224 |
| 11,221,751 | B2* | 1/2022 | Chaudhri | G06F 3/0482 |
| 11,349,678 | B2* | 5/2022 | Kim | H04L 12/1822 |
| 11,361,211 | B2* | 6/2022 | Manaharlal Kakkad | G06N 3/006 |
| 11,411,906 | B2* | 8/2022 | Kim | H04L 51/046 |
| 11,455,081 | B2* | 9/2022 | Voss | G06F 3/0484 |
| 11,546,286 | B2* | 1/2023 | Hwang | H04L 51/10 |
| 11,558,331 | B2* | 1/2023 | Sim | H04L 51/10 |
| 11,558,471 | B1* | 1/2023 | Swift | H04L 65/402 |
| 11,575,529 | B2* | 2/2023 | Jung | H04L 12/1822 |
| 11,586,712 | B2* | 2/2023 | Joung | H04L 51/10 |
| 11,743,224 | B2* | 8/2023 | Hwang | H04L 51/42 709/206 |
| 11,811,515 | B2* | 11/2023 | Sim | H04L 51/224 |
| 11,855,945 | B2* | 12/2023 | Kim | H04L 51/216 |
| 11,936,486 | B2* | 3/2024 | Kim | H04L 12/1845 |
| 11,956,195 | B2* | 4/2024 | Kim | H04L 51/216 |
| 12,041,016 | B2* | 7/2024 | Kang | H04L 51/02 |
| 12,052,210 | B2* | 7/2024 | Kim | H04L 51/046 |
| 12,099,701 | B2* | 9/2024 | Voss | G06F 3/0484 |
| 12,218,898 | B2* | 2/2025 | Kim | H04L 51/04 |
| 12,309,112 | B2* | 5/2025 | Hwang | H04L 51/52 |
| 12,341,734 | B2* | 6/2025 | Kwon | H04L 51/046 |
| 2009/0174551 | A1* | 7/2009 | Quinn | H04L 63/1425 709/224 |
| 2009/0210503 | A1* | 8/2009 | Chang | H04L 67/54 709/206 |
| 2011/0041082 | A1* | 2/2011 | Nguyen | G06Q 10/10 715/752 |
| 2012/0185355 | A1* | 7/2012 | Kilroy | G06Q 30/0633 705/26.8 |
| 2012/0272160 | A1* | 10/2012 | Spivack | H04L 67/535 715/752 |
| 2013/0018960 | A1* | 1/2013 | Knysz | G06Q 50/01 709/204 |
| 2013/0086185 | A1* | 4/2013 | Desmarais | H04L 51/52 709/206 |
| 2013/0125008 | A1* | 5/2013 | Irvine | G06F 3/0482 715/739 |
| 2013/0275348 | A1* | 10/2013 | Booth | G06Q 50/01 706/46 |
| 2014/0280637 | A1* | 9/2014 | Hamilton, II | H04L 65/403 709/206 |
| 2015/0025977 | A1* | 1/2015 | Doyle | G06Q 50/01 705/14.66 |
| 2015/0033153 | A1* | 1/2015 | Knysz | H04L 65/403 715/753 |
| 2016/0191446 | A1* | 6/2016 | Grol-Prokopczyk | G06F 3/04817 709/206 |
| 2018/0270183 | A1* | 9/2018 | Wei | H04L 51/046 |
| 2020/0192743 | A1* | 6/2020 | Harper | G06F 11/0793 |
| 2022/0327293 | A1* | 10/2022 | Kim | H04L 51/063 |
| 2023/0275862 | A1* | 8/2023 | Wang | H04L 51/18 709/206 |
| 2023/0326208 | A1* | 10/2023 | Cooley-White | H04N 21/2743 382/103 |
| 2024/0104609 | A1* | 3/2024 | Lim | G06Q 30/0277 |
| 2024/0143140 | A1* | 5/2024 | Kim | G06F 3/0484 |
| 2024/0388550 | A1* | 11/2024 | Jung | H04L 51/02 |
| 2024/0390803 | A1* | 11/2024 | Kwon | G06F 40/40 |
| 2025/0133039 | A1* | 4/2025 | Kwon | H04L 51/216 |

* cited by examiner

METHOD, COMPUTER DEVICE, AND NON-TRANSITORY COMPUTER-READABLE RECORD MEDIUM TO DISPLAY ACTIVITY TIME INFORMATION FOR CHATROOM

CROSS-REFERENCE TO RELATED APPLICATION(S)

This U.S. non-provisional application and claims the benefit of priority under 35 U.S.C. § 119 to Korean Patent Application No. 10-2023-0066908, filed May 24, 2023, the entire contents of which are incorporated herein by reference in their entirety.

BACKGROUND

Technical Field

Some example embodiments relate to technology for providing information related to activity in a chatroom.

Related Art

An instant messenger that is a general communication tool refers to software that allows a user to send and receive a message or data in real time. The user may register a contact on a messenger and may send and receive messages with a counterpart on a contact list in real time.

Due to such a messenger function, a messenger is commonly used in a mobile environment of a mobile communication terminal as well as a personal computer (PC).

For example, a mobile messenger service system and method of a portable terminal using a wireless communication network to provide a messenger service between mobile messengers installed on mobile terminals have been proposed.

As the use of an instant messenger becomes more popular and functions provided through the instant messenger become more diversified, an openchat function that enables a chat using a link without sharing personal information, such as a telephone number and an ID, is being serviced.

SUMMARY

Some example embodiments may provide a peak time in which member activity within an openchat chatroom is most active.

Some example embodiments may provide member activity trend as a timeline through an openchat cover or an openchat chatroom.

Some example embodiments may identify a hot message in an openchat chatroom and may display a highlight related to the hot message in a timeline.

According to at least one example embodiment, there may be provided an activity time information display method executed by a computer device, wherein the computer device includes at least one processor configured to execute computer-readable instructions included in a memory. The activity time information display method may include receiving, by the at least one processor, a user request for activity time information of a chatroom related to an instant messenger from a user of the computer device for the chatroom related to the instant messenger, and displaying, by the at least one processor, the activity time information of the chatroom on a chatroom-related screen of the chatroom in response to the user request.

According to an aspect, the activity time information display method may further include determining the activity time information based on a member activity pattern of the chatroom.

According to another aspect, the displaying of the activity time information may include displaying a member activity peak time of the chatroom on the chatroom-related screen.

According to still another aspect, the member activity peak time may be set as a time zone in which a number of messages corresponding to chat count is largest.

According to still another aspect, the activity time information display method may further include providing, by the at least one processor, an alarm for the member activity peak time.

According to still another aspect, the displaying of the activity time information may include displaying a member activity timeline during a period of time that includes the member activity peak time on a cover screen of the chatroom, in response to the user request being input on the cover screen on the chatroom-related screen.

According to still another aspect, the displaying of the activity time information may include displaying a member activity trend during a period of time as a timeline on the chatroom-related screen.

According to still another aspect, the displaying of the member activity trend during the period of time as the timeline may include displaying a number of messages per unit of time during the period of time in a graph form over time.

According to still another aspect, the displaying of the member activity trend during the period of time as the timeline may include displaying highlight information based on hot messages selected in the chatroom in association with the timeline.

According to still another aspect, the displaying of the highlight information may include highlighting a message having an indicator value equal to or greater than a level at a location corresponding to a sending time of a corresponding message in the timeline, with respect to at least one indicator used to select the hot messages.

According to still another aspect, the displaying of the highlight information may include displaying, as the highlight information, a message of which a message sending time is within a time section of the timeline among the hot messages.

According to still another aspect, the displaying of the highlight information may include displaying, as the highlight information, at least one keyword included in a message of which a message sending time is within a time section of the timeline among the hot messages.

According to at least one example embodiment, there may be provided a non-transitory computer-readable recording medium storing instructions that, when executed by a processor, cause a computer device to execute the activity time information display method.

According to at least one example embodiment, there is provided a computer device including at least one processor configured to execute computer-readable instructions included in a memory, wherein the at least one processor is configured to cause the computer device to receive a user request for activity time information of a chatroom related to an instant messenger from a user of the computer device for the chatroom related to the instant messenger, and display the activity time information of the chatroom on a chatroom-related screen of the chatroom in response to the user request.

DETAILED DESCRIPTION

Figure 1:
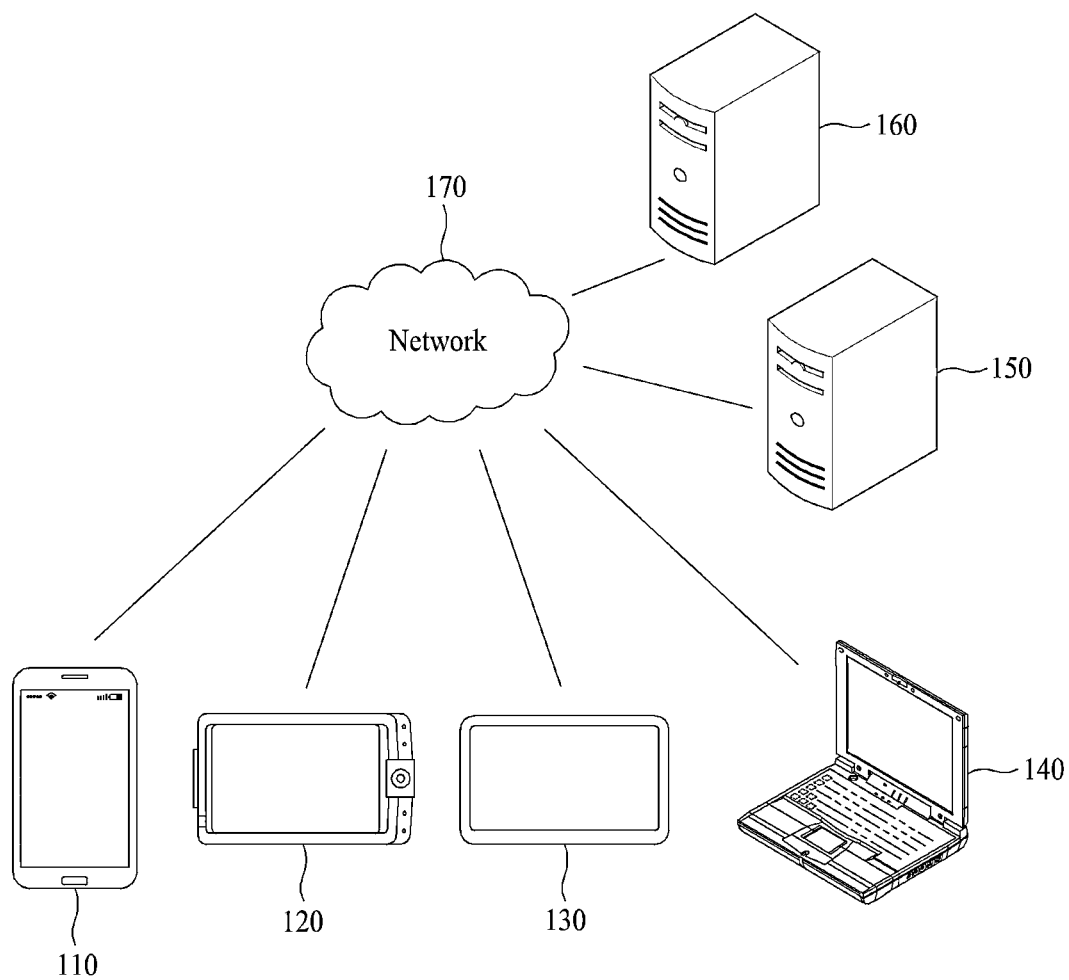
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

Some example embodiments relate to technology for providing information related to activity in a chatroom.

The example embodiments including disclosures herein may provide highlight information based on a peak time in which member activity in a chatroom is most active and a main message (e.g., a hot message) in the chatroom as activity time information of the chatroom, and may easily verify conversation flow without direct participation in conversation.

An activity time information display system according to some example embodiments may be implemented by at least one computer device. An activity time information display method according to some example embodiments may be performed by at least one computer device included in the activity time information display system. Here, a computer program according to an example embodiment may be installed and run on the computer device and the computer device may perform the activity time information display method according to example embodiments under control of the computer program. The aforementioned computer program may be stored in a computer-readable record medium to implement the activity time information display method in conjunction with the computer device.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. The network environment of FIG. 1 is provided as one example of environments applicable to the at least one example embodiments and environments applicable to example embodiments of the present disclosure are not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides or provide an instruction, a code, a file, content, a service, etc., through communication with the plurality of electronic devices 110, 120, 130, and 140 over the network 170. For example, the server 150 may be a system that provides a service, for example, a messenger service, to the plurality of electronic devices 110, 120, 130, and 140 connected over the network 170.

Figure 2:
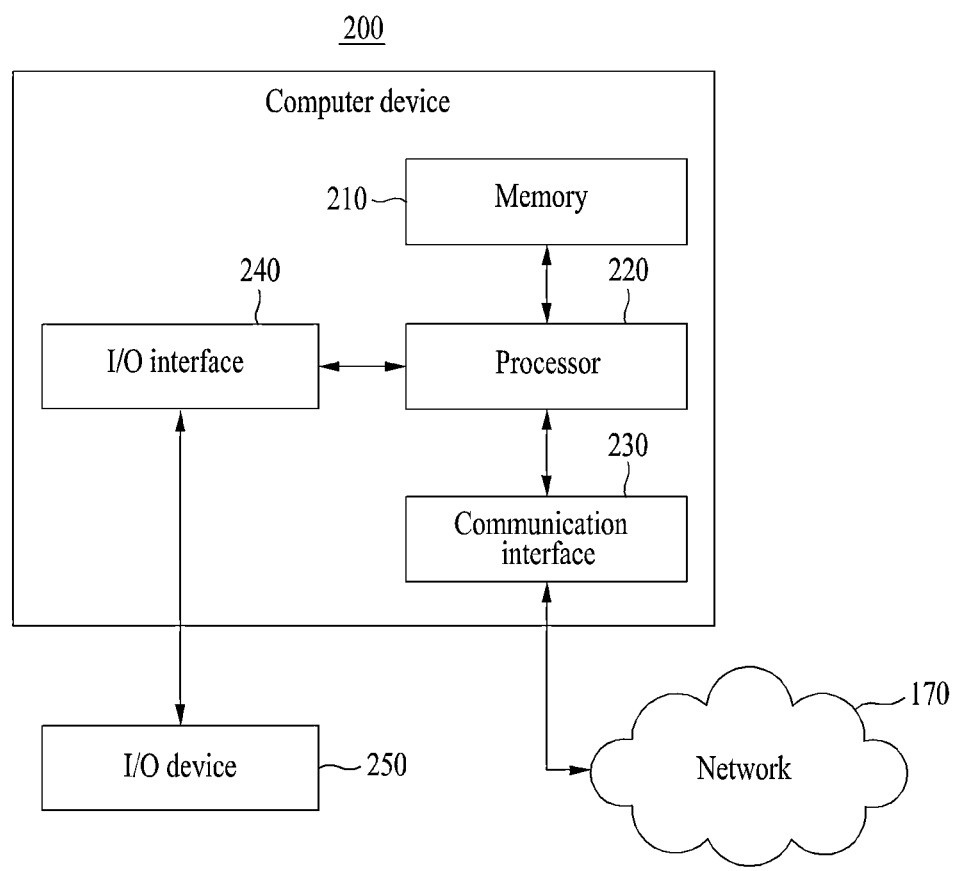
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer device 200 based on a computer program installed by files that have been received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function for communication between the communication apparatus 200 and another apparatus, for example, the aforementioned storage devices, over the network 170. For example, the processor 220 of the computer device 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be forwarded to the processor 220 or the memory 210, and a file, etc., may be stored in a storage medium, for example, the permanent storage device, further includable in the computer device 200.

The I/O interface 240 may be a device used for interfacing with an I/O device 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O device 250 may be configured as a single apparatus with the computer device 200.

Also, according to other example embodiments, the computer device 200 may include a greater or smaller number of components than the number of components of FIG. 2. However, there is no need to clearly illustrate most conventional components. For example, the computer device 200 may be configured to include at least a portion of the I/O device 250 or may further include other components, such as a transceiver and a database.

Hereinafter, some example embodiments of methods and devices for displaying activity time information of a chatroom are described.

Although the following example embodiments are described using an instant messenger as a representative example, any social platform that provides various types of services using resources, such as user profile information and friend relationships in a social network service, as well as the social network service, such as various communities, may be applicable.

Herein, openchat refers to a chat service that allows users to have conversations over a topic of interest and also refers to a community service that allows direct chatting through a link such as a uniform resource locator (URL), without a friend addition process using a telephone number or an ID. An openchat link may include a function that automatically launches a messenger and runs a chatroom of a corresponding link to allow an immediate chat (e.g., an immediate chat participation) in response to clicking the link.

The example embodiments may provide highlight information based on a peak time in which member activity in a chatroom is most active and a main message (e.g., a hot message) in the chatroom as openchat activity time information.

The following example embodiments are described using openchat as a representative example, but example embodiments are not limited thereto and may be applicable to any chatroom associated with an instant messenger, such as a one-to-one chatroom, a group chatroom, an official account chatroom, and the like, in addition to openchat.

The computer device 200 according to the example embodiments may provide clients with a messenger service through connection to an exclusive application installed on the client or a website/mobile site related to the computer device 200. An activity time information display system implemented as a computer may be configured in the computer device 200. For example, the activity time information display system may be implemented in the form of a program that independently operates or may be configured in an in-app form of a specific application to be operable on the specific application.

The processor 220 of the computer device 200 may be implemented as a component to perform the following activity time information display method. Depending on example embodiments, components of the processor 220 may be selectively included in or excluded from the processor 220. Also, depending on example embodiments, the components of the processor 220 may be separated or merged for functional representation of the processor 220.

The processor 220 and the components of the processor 220 may control the computer device 200 to perform operations included in the following activity time information display method. For example, the processor 220 and the components of the processor 220 may be configured to execute an instruction according to a code of at least one program and a code of an OS included in the memory 210.

Here, the components of the processor 220 may be representations of different functions performed by the processor 220 in response to an instruction provided from a program code stored in the computer device 200.

The processor 220 may read a desired instruction from the memory 210, to which instructions related to control of the computer device 200 are loaded. In this case, the read instruction may include an instruction for controlling the processor 220 to perform the following operations.

Operations included in the following activity time information display method may be performed in order different from illustrated order. Some of the operations may be omitted or an additional process may be further included.

Operations included in the activity time information display method may be performed by the client. Depending on example embodiments, at least some of operations may be performed by the server 150.

Figure 3:
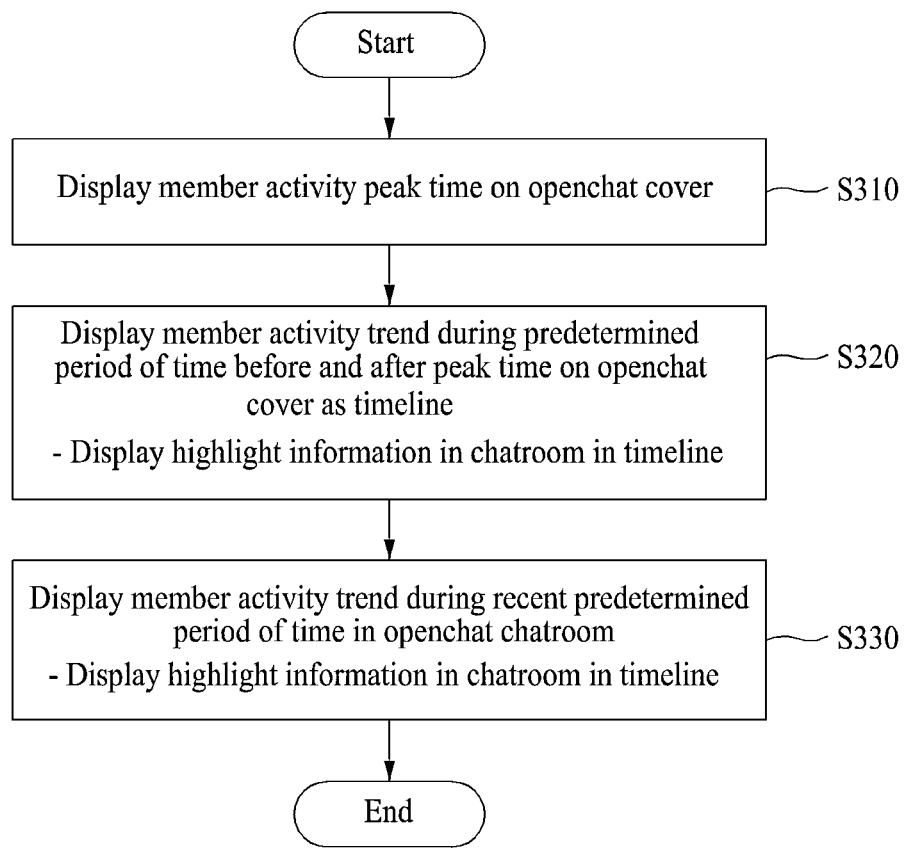
FIG. 3 is a flowchart illustrating an example of a method performed by a computer device according to at least one example embodiment.

FIG. 3 is a flowchart illustrating an example of a method performed by a computer device according to at least one example embodiment.

When a user request for a chatroom in a messenger is received, the processor 220 may display activity time information of the corresponding chatroom on a chatroom-related screen in response to the user request. Here, the chatroom-related screen may include a chatroom cover screen for providing information on the chatroom before entering the chatroom and a conversation screen for exchanging conversation between members of the chatroom by entering the chatroom. The processor 220 may analyze a member activity pattern of the chatroom and may determine activity time information of the corresponding chatroom based on analysis results. For example, the activity time information of the chatroom may include a peak time in which member activity in the chatroom is most active and may further include a timeline representing a member activity trend during a desired (or alternatively, predetermined period) of time including a member activity peak time or a desired (or alternatively, predetermined) period of time with an arbitrary length.

Referring to FIG. 3, in operation S310, the processor 220 may enter a corresponding openchat cover in response to an openchat cover entry request from the user, and may display a peak time in which member activity in the chatroom is most active on the openchat cover. Herein, the openchat cover may represent a home screen (main screen) for displaying information on openchat (e.g., openchat name, profile image, openchat description, number of joined members, etc.) before entering the openchat chatroom. For example, the processor 220 may count the number of messages exchanged between members per unit of time (e.g., 1 hour) and may set a time zone in which the number of messages (chat count) is largest as a member activity peak time. The member activity peak time may be updated periodically, for example, on a daily basis or a monthly basis. When the user enters the openchat cover, the processor 220 may display the member activity peak time on the openchat cover as one piece of information on the openchat.

The aforementioned peak time setting process may be performed on a client side. Depending on example embodiments, the server 150 may set the member activity peak time for each openchat and may deliver the set peak time to the client.

In operation S320, in response to the user request, for example, when the peak time is selected on the openchat cover by the user, the processor 220 may display, on the openchat cover as a timeline, a member activity trend during a desired (or alternatively, predetermined) period of time before or after the peak time based on the peak time. The member activity timeline represents the member activity trend during the desired (or alternatively, predetermined) period of time including the peak time. For example, the processor 220 may display member activity from 3 hours before the peak time until 5 hours after the peak time. A timeline time section may be determined as a default section or may be determined in consideration of a member activity pattern for each openchat. The timeline time section may be set by an openchat administrator (admin). For example, in response to the user request, the processor 220 may display, on the openchat cover, the number of messages per unit of time in a graph form over time as the member activity trend during the desired (or alternatively, predetermined) period of time. A user that enters the openchat cover may identify a time zone in which openchat members are actively having conversation, a time zone in which conversation is currently ongoing between members, and the like, through the member activity timeline.

To generate highlight information of the openchat chatroom, the processor 220 may select a main message (e.g., a hot message with high participation, popularity, or information) from among messages included in the corresponding chatroom. For example, the processor 220 may select the hot message based on reactions of other users participating in the chatroom. For example, the processor 220 may select, as the hot message, a message in which a positive reaction, such as like, mention, reply, comment, share, capture, and keep, from other users, from among messages included in the openchat chatroom meets a condition (e.g., a determined or preset condition). As another example, the processor 220 may track the number of page views (PVs) or a view time by users participating in the chatroom and may select, as the hot message, a message in an area with a high view over a desired (or alternatively, predetermined) number or time. As another example, the processor 220 may intentionally bundle comments on a specific message through a thread function in the chatroom, and may select, as the hot message, a message that meets a condition by comments accumulated in the thread. As another example, the processor 220 may select at least one message as the hot message based on a point in time at which the number of users participating in (connected to) the chatroom in the same time zone is greater than or equal to a threshold, a point in time at which the number of messages rapidly increases to be greater than or equal to a threshold, or a point in time at which the average stay time of each user participating in the chatroom is greater than or equal to a threshold. As another example, the processor 220 may select a message that includes a keyword selected or preset by an openchat administrator as a message that is highly likely to be useful to users in terms of information. The administrator may determine or preset at least one keyword of interest through settings for the openchat chatroom, and the processor 220 may select, as the hot message, a message that includes a specific keyword determined or set by the administrator from among messages included in the chatroom. In addition to a keyword directly set by the openchat administrator, the processor 220 may select the hot message using a keyword that matches a category of the chatroom. As another example, the processor 220 may extract a topic with high topicality by analyzing a conversation pattern in the chatroom and may select a message that matches the corresponding topic as the hot message. The processor 220 may extract at least one word that is talked about in the chatroom based on a unit of time and may determine a word that exceeds a certain level as the topic with topicality using the probability distribution of topic for each message included in the chatroom. The processor 220 may select, as the hot message, a message that includes a keyword identical to or similar to each topic from among messages included in the chatroom.

The aforementioned hot message selection process may be performed on a client side. Depending on a message selection method, the server 150 may select the hot message and may deliver information on the selected hot message to the client.

The processor 220 may display, on the openchat cover, highlight information based on an in-chatroom hot message in association with the member activity timeline. For example, the processor 220 may display, as highlight information, a message of which a message sending time is within a timeline time section among hot messages selected in the chatroom. As another example, the processor 220 may display, as highlight information, at least one keyword included in a message of which a message sending time is within the timeline time section among hot messages selected in the chatroom. For example, the processor 220 may display, as highlight information, keywords that appear frequently at least a desired (or alternatively, predetermined) number of times as a word cloud that targets a message of which a message sending time is within the timeline time section. As another example, for each indicator used for hot message selection, the processor 220 may display a corresponding hot message as highlight information if a corresponding indicator value of the hot message is greater than or equal to a threshold level or a preset level. For example, the processor 220 may provide thread highlighting at a corresponding message sending time in the timeline for a message having 50 or more thread comments among hot messages corresponding to the timeline time section. That is, the processor 220 may highlight indicators (e.g., the number of threads, the number of likes, the number of PVs or view time, and the number of saves) above a set value with respect to hot messages corresponding to the timeline time section. Indicators displayed as highlight information and a setting value for each indicator may be set by the openchat administrator. A user that enters the openchat cover may identify at a glance exchanged conversation and a point in time of a message having a high indicator value through highlight information displayed in the member activity timeline.

In operation S330, the processor 220 may display a member activity trend during a recent desired (or alternatively, predetermined) period of time in the openchat chatroom as a timeline in response to a user request in a state in which the user has entered the openchat chatroom. The timeline in the openchat chatroom represents a member activity trend during a recent period of time and, for example, may show member activity from a current point in time to previous 12 hours. The processor 220 may provide a timeline of a time section set as default or a timeline of a time section directly set by the openchat administrator or the user. For example, in response to the user request, the processor 220 may display, in the openchat chatroom, the number of messages per unit of time in a graph form over time as the member activity trend during the recent period of time.

Similar as described in operation S320, the processor 220 may display highlight information based on hot messages selected in the chatroom in association with the member activity timeline in the openchat chatroom. For example, for each indicator used for hot message selection, the processor 220 may display a corresponding hot message as highlight information if a corresponding indicator value of the hot message is greater than or equal to a threshold level or a preset level. For example, the processor 220 may provide thread highlighting at a corresponding message sending time in the timeline for a message having 50 or more thread comments among hot messages corresponding to the timeline section. That is, the processor 220 may highlight indicators (e.g., the number of threads, the number of likes, view time, and the number of saves) above a set value with respect to hot messages corresponding to the timeline time section. Indicators displayed as highlight information and a setting value for each indicator may be set by the openchat administrator. The user may identify at a glance which indicators appear high and at which point in time a message has a high indicator value, through highlight information displayed in the member activity timeline in the openchat chatroom.

Figure 4:
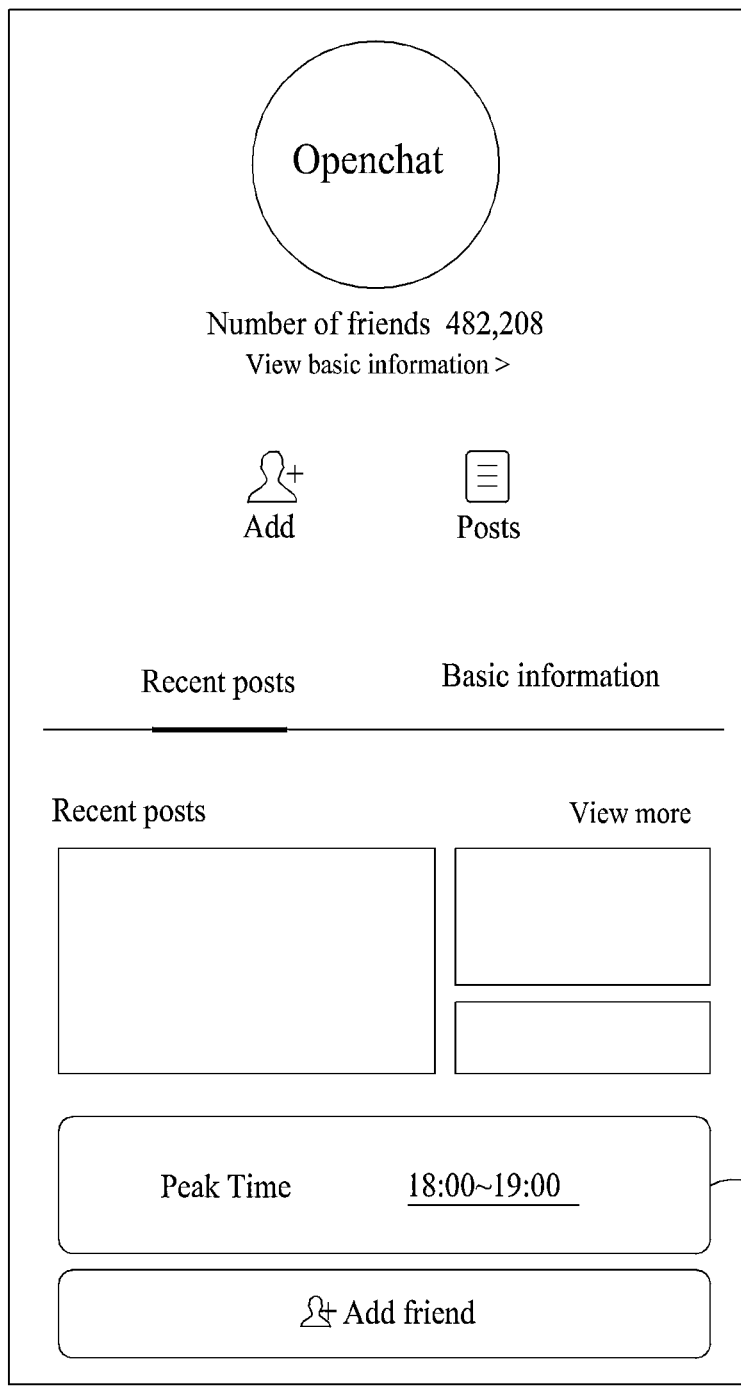
FIG. 4 illustrates an example of an openchat cover screen on which a peak time is displayed according to at least one example embodiment.

FIG. 4 illustrates an example of an openchat cover screen on which a peak time is displayed according to at least one example embodiment.

FIG. 4 illustrates an example of an openchat cover screen 400 for introducing openchat.

Referring to FIG. 4, an openchat name, a profile image, openchat description, and the number of joined members may be displayed on the openchat cover screen 400 and a friend addition user interface (UI) for joining as a member may be included.

The openchat cover screen 400 according to the example embodiment may include a peak time UI 410 for specifying a time zone in which member activity in a chatroom is most active. For example, a time zone with the largest number of messages exchanged between members may be set as a member activity peak time and displayed through the peak time UI 410.

Figure 5:
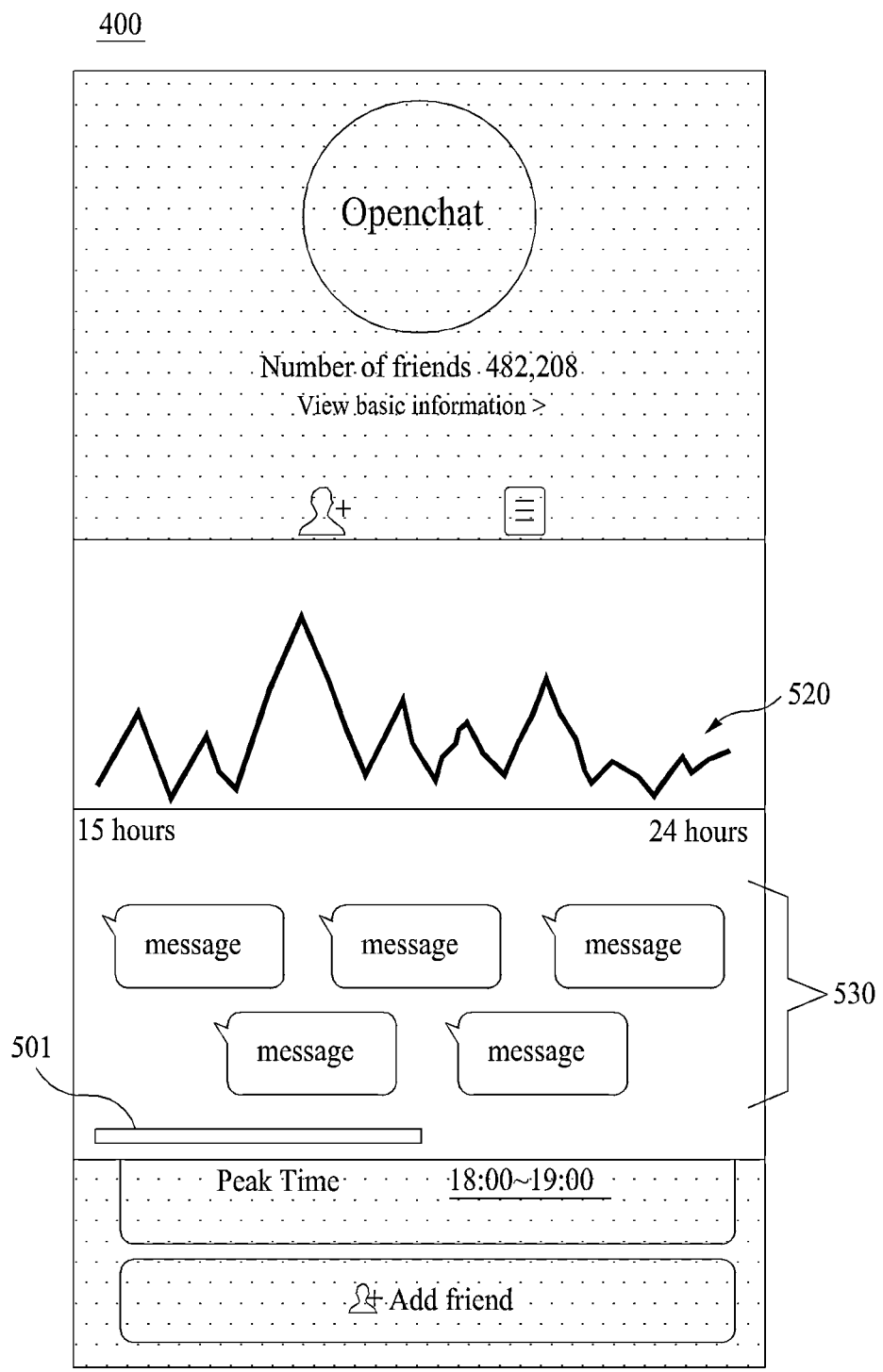
FIGS. 5 to 7 illustrate examples of an openchat cover screen on which highlight information is displayed according to at least one example embodiment.
Figure 6:
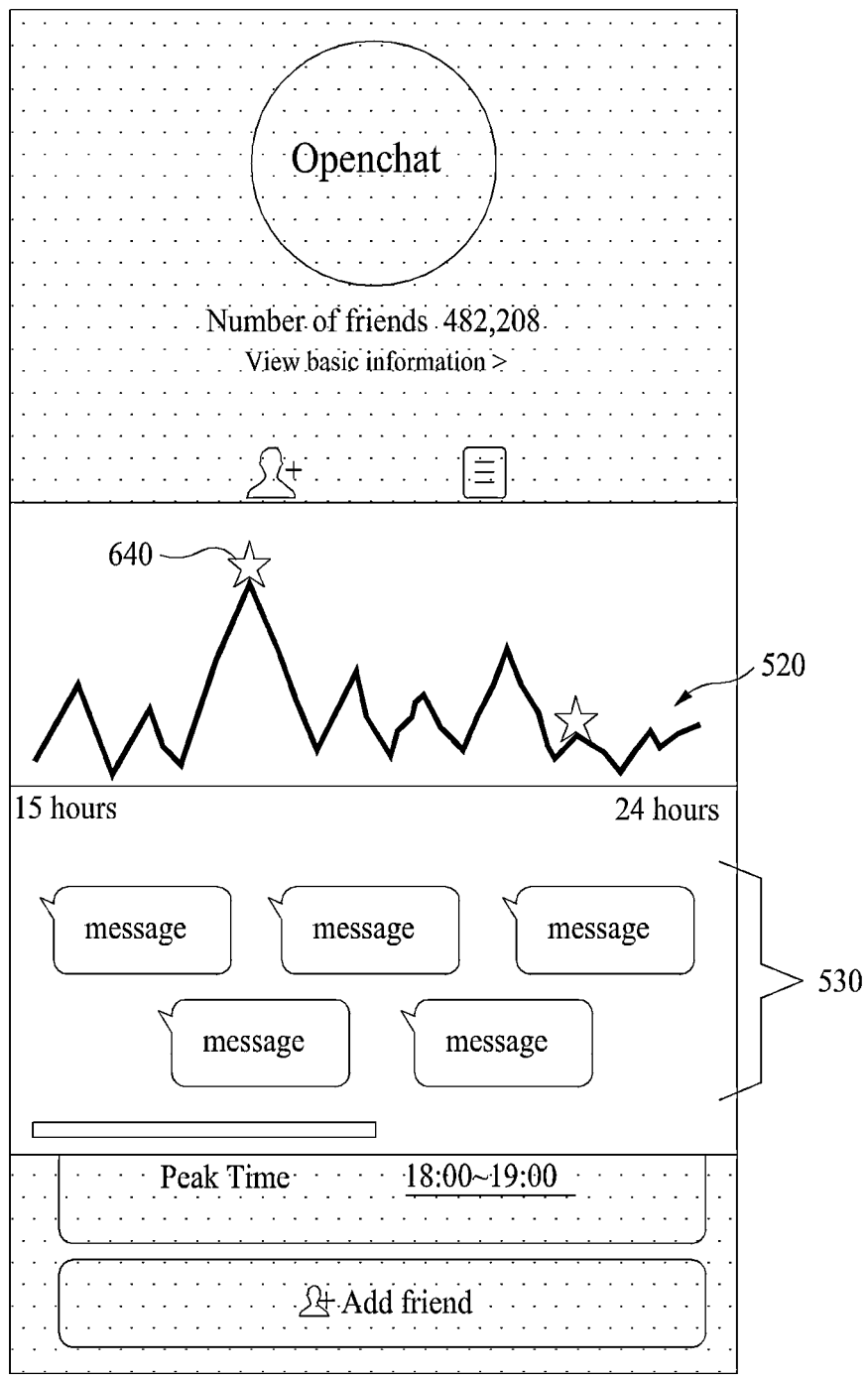
Figure 7:
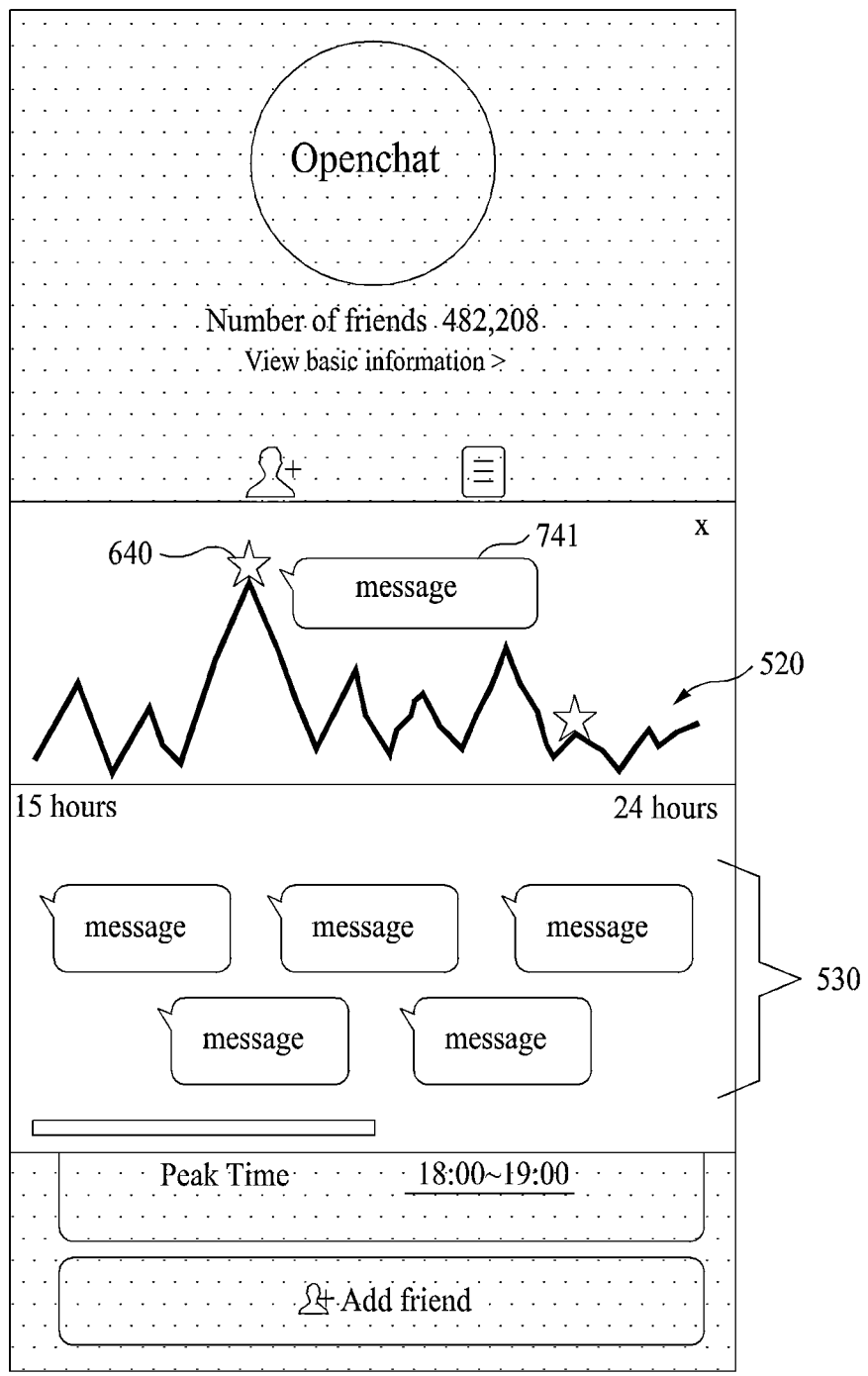

FIGS. 5 to 7 illustrate examples of an openchat cover screen on which highlight information is displayed according to at least one example embodiment.

In response to the peak time UI 410 selected on the openchat cover screen 400, the processor 220 may display a member activity trend during a desired (or alternatively, predetermined) period of time including a peak time as a timeline 520 as shown in FIG. 5. In the member activity timeline 520, the number of messages per unit of time may be expressed as a time axis graph.

The processor 220 may display highlight information based on in-chatroom hot messages in association with the member activity timeline 520. For example, referring to FIG. 5, the processor 220 may display, as one piece of highlight information, messages 530 each of which a message sending time is within a time section of the member activity timeline 520 among hot messages selected in the openchat chatroom. The highlight messages 530 may be displayed in the member activity timeline 520 in chronological order. Depending on example embodiments, the processor 220 may display, as highlight information, keywords that frequently appear in the highlight messages 530, such as word cloud, instead of the highlight messages 530.

The member activity timeline 520 may include a scroll bar 501 scrollable on a time axis, and the highlight messages 530 may be updated based on hot messages of a time section scrolled through the scroll bar 501. The conversation flow within the chatroom may be continuously verified by scrolling the member activity timeline 520.

Referring to FIG. 6, the processor 220 may display a corresponding indicator icon 640, as another piece of highlight information, for an indicator value above a setting level in relation to the highlight messages 530. For example, the processor 220 may highlight the indicator icon 640 of a thread function at a location corresponding to a sending time of a corresponding message in the member activity timeline 520 for the message having 50 or more thread comments among the highlight messages 530. Through the indicator icon 640 of the thread function, a time zone of a message having many threads in the chatroom may be known. In addition to a thread, highlighting may be provided for all indicators used for hot message selection.

In response to the indicator icon 640 selected in the member activity timeline 520 on the openchat cover screen 400, the processor 220 may display a message 741 that is a target of an indicator as shown in FIG. 7. In addition to separately display the message 741 that is a target of the indicator icon 640, the processor 220 may display the message 741 that is the target of the indicator icon 640 to be distinguished from other messages among the highlight messages 530.

In the example embodiment, the user may immediately identify a member activity peak time, a member activity trend, and a main conversation topic in an openchat cover, without entering an openchat chatroom.

Also, the processor 220 may provide an alarm setting function for the member activity peak time of openchat. When a peak time alarm for the openchat is set, the processor 220 may provide an alarm based on a peak time and may induce participation in the openchat at the peak time.

Figure 8:
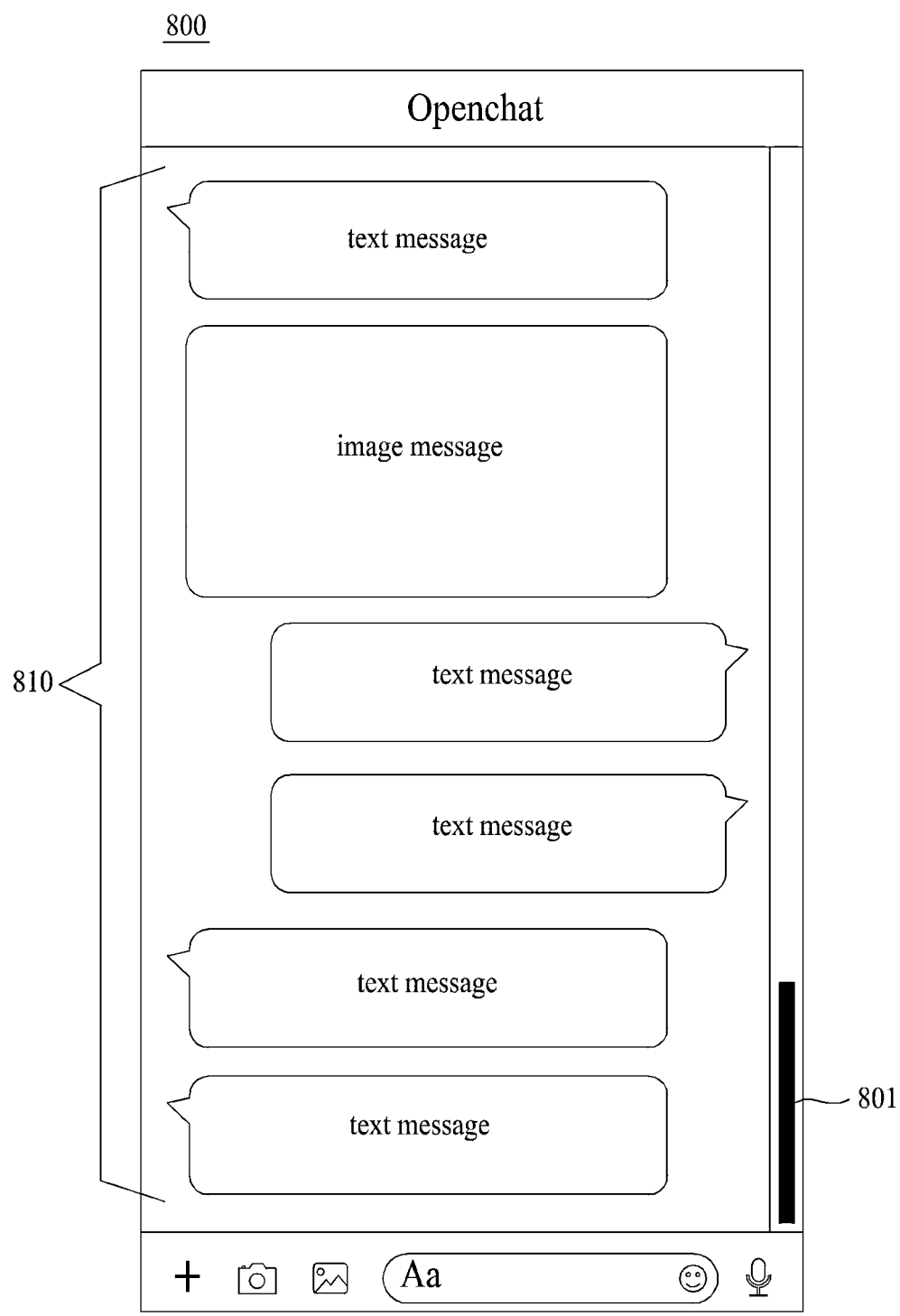
FIG. 8 illustrates an example of an openchat chatroom screen according to at least one example embodiment.

FIG. 8 illustrates an example of an openchat chatroom screen according to at least one example embodiment.

FIG. 8 illustrates an example of an openchat chatroom 800.

Referring to FIG. 8, messages 810 exchanged between users participating in openchat may be included in the openchat chatroom 800. The messages 810 may include any type of messages sharable through the chatroom, such as text, image, audio, sticker (or emoticon), and document.

The openchat chatroom 800 may include a scroll bar 801 as a search function for the messages 810.

Figure 9:
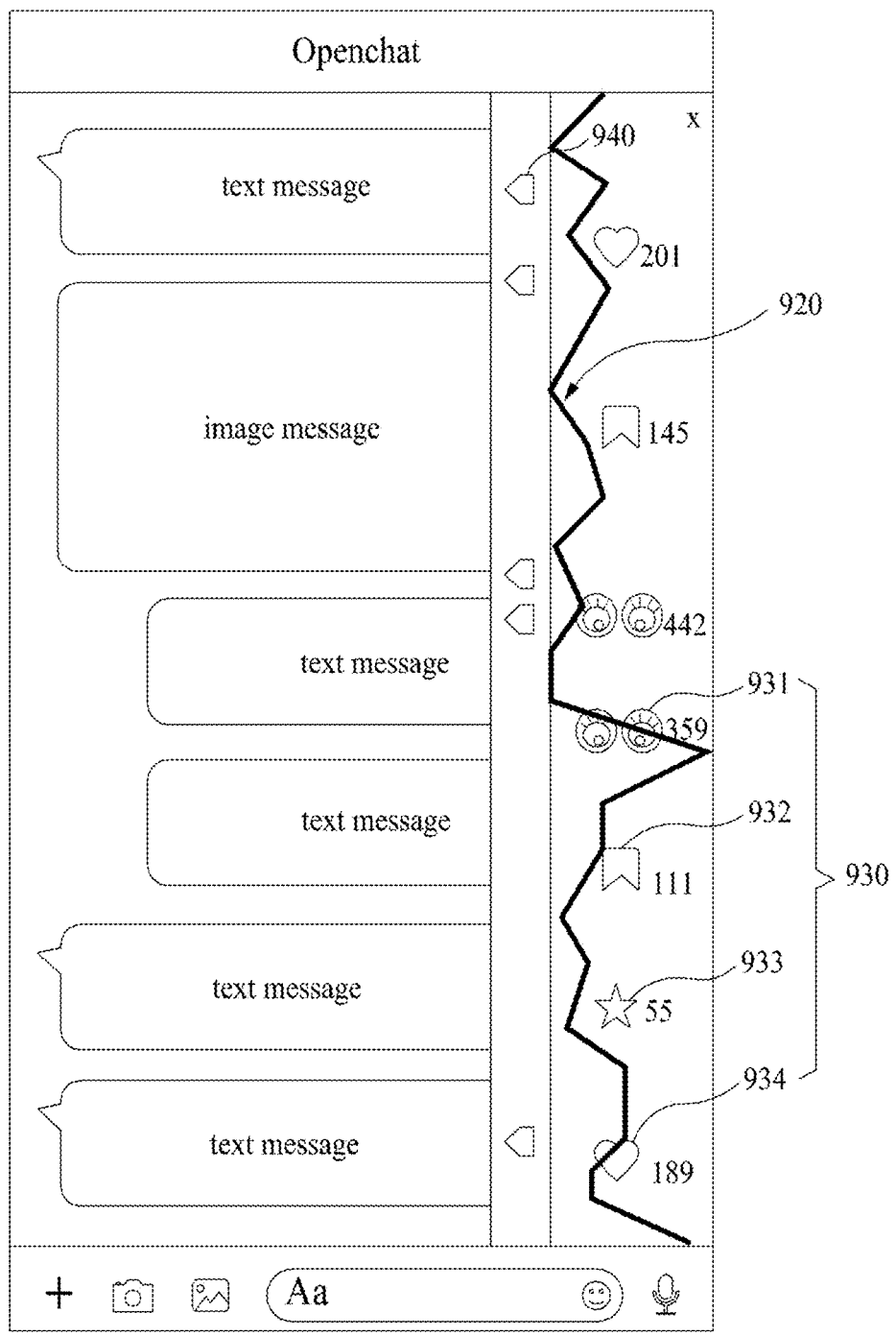
FIGS. 9 and 10 illustrate examples of an openchat chatroom screen on which highlight information is displayed according to at least one example embodiment.
Figure 10:
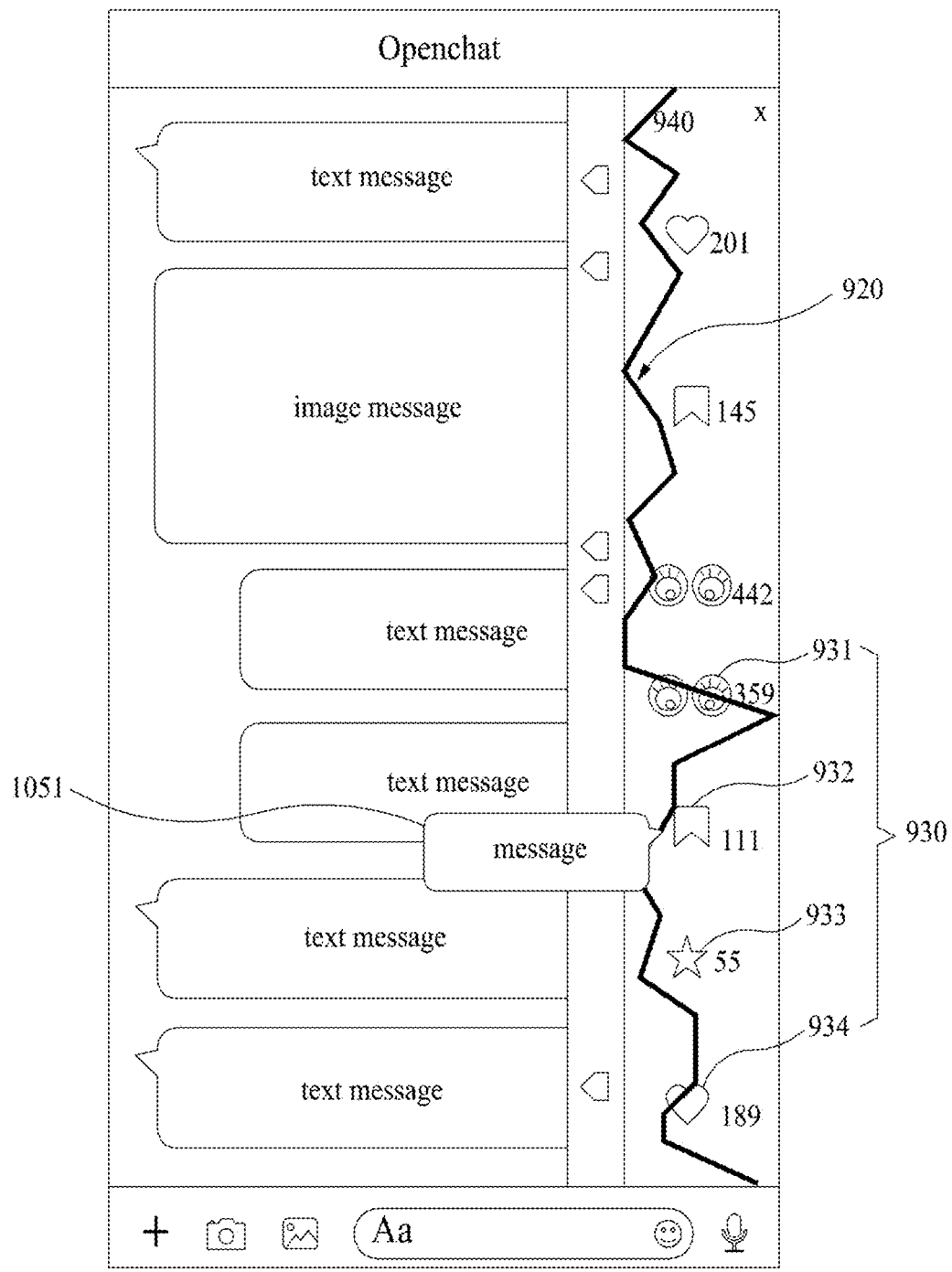

FIGS. 9 and 10 illustrate examples of an openchat chatroom screen on which highlight information is displayed according to at least one example embodiment.

In response to a user request in the openchat chatroom 800, for example, in response to input of a long tap on the scroll bar 801, the processor 220 may display a member activity trend during a recent desired (or alternatively, predetermined) period of time as a timeline 920 in the openchat chatroom 800. In the member activity timeline 920, the number of messages per unit of time may be expressed as a time axis graph.

The processor 220 may display highlight information based on hot messages in the openchat chatroom 800 in association with the member activity timeline 920. For example, the processor 220 may display, as one piece of highlight information, a corresponding indicator icon 930 for an indicator value above a setting level in relation to hot messages selected in the openchat chatroom 800. As an example of the indicator icon 930, the processor 220 may highlight a PV icon 931 at a location corresponding to a sending time of a corresponding message in the member activity timeline 920 for the message with 300 or more PVs among hot messages selected in the openchat chatroom 800. Also, for a message that has been saved 100 times or more among hot messages selected in the openchat chatroom 800, the processor 220 may highlight a save icon 932 at a location corresponding to a sending time of the corresponding message. Also, for a message having 50 or more thread comments among hot messages selected in the openchat chatroom 800, the processor 220 may highlight a thread icon 933 at a location corresponding to a sending time of the corresponding message. Also, for a message having 150 or more likes among hot messages selected in the openchat chatroom 800, the processor 220 may highlight a like icon 934 at a location corresponding to a sending time of the corresponding message in the member activity timeline 920. The processor 220 may display a count value of a corresponding indicator along with the indicator icon 930. The processor 220 may provide highlighting for all indicators used for hot message selection, including the number of PVs, the number of saves, the number of messages in a thread, and the number of likes.

The processor 220 may display additional information related to a message, such as bookmark information, in addition to highlight information related to hot message selection indicators, in association with the member activity timeline 920. For example, as shown in FIG. 9, the processor 220 may display a bookmark icon 940 at a location corresponding to a sending time of a bookmarked message among messages included in a timeline time section in the member activity timeline 920.

In response to the indicator icon 930 selected in the member activity timeline 920 in the openchat chatroom 800, the processor 220 may display a message 1051 that is a target of a corresponding indicator as shown in FIG. 10. In response to the bookmark icon 940 selected in addition to the indicator icon 930, the processor 220 may also display a message that is a target of a corresponding bookmark.

As described above, according to the example embodiments, by providing highlight information based on a peak time in which member activity in a chatroom is most active and hot messages in the chatroom, it is possible to enable a user to easily understand the conversation flow without directly participating in conversation and to effectively mitigate or prevent a user having a difficulty in understanding the context of conversation due to many unread messages from leaving the chatroom. Accordingly, network resources and communication and/or computing resources of a computing device may be effectively used (e.g., less resources may be used) when considering participation in the chatroom. In other words, the activity time information of a chatroom can be easily obtained without individually entering the chatroom, reviewing the contents therein, and performing resources-consuming compiling of activity time information based on the results of reviewing the contents of the chatroom.

The apparatuses described above may be implemented using hardware components, software components, and/or combination thereof. For example, the apparatuses and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For simplicity, the description of the processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, or in a propagated signal wave capable of providing instructions or data to or being interpreted by the processing device. The software also may be distributed over network coupled computer devices so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may continuously store computer-executable programs or may temporarily store the same for execution or download. Also, the media may be various types of recording devices or storage devices in a form in which one or a plurality of hardware components are combined. Without being limited to media directly connected to a computer device, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

Any functional blocks shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While this disclosure includes some example embodiments, it will be apparent to one of ordinary skill in the art that various alterations and modifications in form and details may be made in the disclosed example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other example embodiments, and equivalents are within the scope of the following claims.

What is claimed is:

1. An activity time information display method executed by a computer device, wherein the computer device comprises at least one processor configured to execute computer-readable instructions included in a memory, the activity time information display method comprising:
receiving, by the at least one processor, a user request for activity time information of a chatroom related to an instant messenger from a user of the computer device for the chatroom related to the instant messenger; and
displaying, by the at least one processor, the activity time information of the chatroom on a chatroom-related screen of the chatroom in response to the user request,
wherein the displaying of the activity time information comprises displaying a member activity timeline during a period of time that includes a member activity peak time on a cover screen of the chatroom, in response to the user request being input on the cover screen on the chatroom-related screen.

2. The activity time information display method of claim 1, further comprising:
determining the activity time information based on a member activity pattern of the chatroom.

3. The activity time information display method of claim 1, wherein the member activity peak time is set as a time zone in which a number of messages corresponding to chat count is largest.

4. The activity time information display method of claim 1, further comprising:
providing, by the at least one processor, an alarm for the member activity peak time.

5. The activity time information display method of claim 1, wherein the displaying of the activity time information comprises displaying a member activity trend during a period of time as a timeline on the chatroom-related screen.

6. The activity time information display method of claim 5, wherein the displaying of the member activity trend during the period of time as the timeline comprises displaying a number of messages per unit of time during the period of time in a graph form over time.

7. The activity time information display method of claim 5, wherein the displaying of the member activity trend during the period of time as the timeline comprises displaying highlight information based on hot messages selected in the chatroom in association with the timeline.

8. The activity time information display method of claim 7, wherein the displaying of the highlight information comprises highlighting a message having an indicator value equal to or greater than a level at a location corresponding to a sending time of a corresponding message in the timeline, with respect to at least one indicator used to select the hot messages.

9. The activity time information display method of claim 7, wherein the displaying of the highlight information comprises displaying, as the highlight information, a message of which a message sending time is within a time section of the timeline among the hot messages.

10. The activity time information display method of claim 7, wherein the displaying of the highlight information comprises displaying, as the highlight information, at least one keyword included in a message of which a message sending time is within a time section of the timeline among the hot messages.

11. A non-transitory computer-readable recording medium storing instructions that, when executed by a processor, cause a computer device to execute the activity time information display method of claim 1.

12. A computer device comprising:
at least one processor configured to execute computer-readable instructions included in a memory,
wherein the at least one processor is configured to cause the computer device to,
receive a user request for activity time information of a chatroom related to an instant messenger from a user of the computer device for the chatroom related to the instant messenger; and
display the activity time information of the chatroom on a chatroom-related screen of the chatroom in response to the user request,
wherein the at least one processor is configured to cause the computer device to display the activity time information by displaying a member activity timeline during a period of time that includes a member activity peak time on a cover screen of the chatroom, in response to the user request being input on the cover screen on the chatroom-related screen.

13. The computer device of claim 12, wherein
the member activity peak time is set as a time zone in which a number of messages corresponding to chat count is largest.

14. The computer device of claim 12, wherein the at least one processor is configured to cause the computer device to display activity time information of the chatroom by displaying a member activity trend during a period of time as a timeline on the chatroom-related screen.

15. The computer device of claim 14, wherein the at least one processor is configured to cause the computer device to display the member activity trend by displaying a number of messages per unit of time during the period of time in a graph form over time.

16. The computer device of claim 14, wherein the at least one processor is configured to cause the computer device to display the member activity trend by displaying highlight information based on hot messages selected in the chatroom in association with the timeline.

17. The computer device of claim 16, wherein the at least one processor is configured to cause the computer device to display the highlight information by highlighting a message having an indicator value equal to or greater than a level at a location corresponding to a sending time of a corresponding message in the timeline, with respect to at least one indicator used to select the hot messages.

18. The computer device of claim 16, wherein the at least one processor is configured to cause the computer device to display the highlight information by displaying, as the highlight information, a message of which a message sending time is within a time section of the timeline among the hot messages.

* * * * *